(12) United States Patent
Mascarenhas et al.

(10) Patent No.: US 7,334,818 B2
(45) Date of Patent: Feb. 26, 2008

(54) SWING DOWN FUEL TANK BRACKET

(75) Inventors: Noel Mascarenhas, Houston, TX (US); Kevin Krakora, Katy, TX (US); Roger L. Bell, Cypress, TX (US)

(73) Assignee: Mitsubishi Caterpillar Forklift America Inc., Houston, TX (US)

( * ) Notice: Subject to any disclaimer, the term of this patent is extended or adjusted under 35 U.S.C. 154(b) by 108 days.

(21) Appl. No.: 10/727,769

(22) Filed: Dec. 4, 2003

(65) Prior Publication Data

US 2005/0121572 A1   Jun. 9, 2005

(51) Int. Cl.
*B60P 3/22* (2006.01)
(52) U.S. Cl. ............... 280/830; 280/834; 280/838; 248/240
(58) Field of Classification Search .......... 248/240, 248/346.01; 280/830, 760, 769
See application file for complete search history.

(56) References Cited

U.S. PATENT DOCUMENTS

| | | | | | |
|---|---|---|---|---|---|
| 4,025,080 | A | * | 5/1977 | Gedeon | 280/834 |
| 4,770,428 | A | * | 9/1988 | Sugiyama | 280/834 |
| 4,846,499 | A | * | 7/1989 | Izumi et al. | 280/830 |
| 5,634,665 | A | * | 6/1997 | Jung | 280/834 |
| 5,845,940 | A | * | 12/1998 | Colburn | 280/830 |
| 5,904,372 | A | * | 5/1999 | Ito et al. | 280/834 |
| 6,637,706 | B2 | * | 10/2003 | Kim et al. | 248/154 |

OTHER PUBLICATIONS

Notification of Transmittal of the International Search Report or the Declaration; International Search Report; and Written Opinion issued on corresponding PCT Application No. PCT/US04/40662; Dated May 22, 2006; 8 pages.

* cited by examiner

*Primary Examiner*—Amy J. Sterling
(74) *Attorney, Agent, or Firm*—Osha Liang LLP

(57) ABSTRACT

A swing down tank bracket for supporting a fuel tank mounted onto a vehicle includes a frame immovably mounted onto a vehicle, a cradle operatively connected to the frame and arranged to support a fuel tank, a hinge that pivotally connects a first end of the cradle to a first end of the frame, and a latch having a first portion disposed on a second end of the frame and a second portion disposed on a second end of the cradle. The first portion of the latch is releasably engaged with the second portion of the latch so that after the latch is disengaged, the cradle is rotationally maneuverable between a retracted position and an extended position in a single stage. The cradle may be maneuvered between the retracted position and the extended position by simultaneously rotating outwardly and downwardly in relation to the vehicle. In some embodiments, a gas spring device, connected between the cradle and the frame, retards and assists the motion of the rotating cradle in a manner that requires minimal effort on the part of the operator in loading and unloading the fuel tank from the vehicle. Another device ay be included to latch the cradle in the extended position in order to provide stability when loading/unloading a fuel tank.

16 Claims, 6 Drawing Sheets

SWING DOWN FUEL TANK BRACKET

BACKGROUND OF INVENTION

Forklift trucks come in many sizes and capacities and are typically powered using batteries, gasoline, diesel fuel, or liquid propane. Typically, forklift trucks powered by liquid propane ("LP") fuel are equipped with a removable fuel tank, which generally is constructed from steel or aluminum and weighs from 33.5 lbs when empty to 88 lbs when full. The fuel tank is typically secured to the forklift truck on a fuel tank bracket mounted on or near a counterweight at the truck's rear. The tank bracket ensures that the fuel tank remains relatively immobile during truck operation.

This placement often means that the tank bracket is positioned at or above an operator's chest level and up to an arm's length away. Thus, to load a fuel tank onto or off of the tank bracket, the operator is required to lift the fuel tank up above the counterweight and reach over part of the length of the counterweight. Because a full or substantially full fuel tank can be quite heavy, loading and unloading a fuel tank can be dangerous and may subject an operator to injury. In order to relieve some of the burden on the operator, some tank brackets are designed to provide an operator with assistance in the loading and unloading of the fuel tank.

Generally, a tank bracket designed to provide operator assistance includes a frame mounted on the forklift truck and a cradle pivotally connected to the frame via one or more pivots. The frame secures the tank bracket to the forklift truck, and the cradle supports the fuel tank. Typically, the cradle is maneuverable between two positions. In the first position, referred to herein as a "retracted position," the fuel tank is immovably locked onto the forklift truck by a latching mechanism. Typically, when the tank bracket is in the retracted position, the cradle lies inside the truck's body frame above the counterweight. In the second position, referred to herein as an "extended" position, the fuel tank may be more easily loaded onto and unloaded off of a forklift truck. Typically, when a tank bracket is in an extended position, the cradle lies outside the truck's body frame to the rear or a side of the counterweight.

To maneuver the cradle between the retracted and extended positions, the cradle is pivotally rotated using one or more stages. For example, a cradle moved from a retracted position to an extended position using one stage is typically rotated in a plane substantially parallel to the top surface of the counterweight about a single pivot using a single rotational motion. A tank bracket having a cradle moved to an extended position using a single stage is referred to as a "single stage" tank bracket. A cradle moved from a retracted position to an extended position using two stages may be rotated in a horizontal plane that is substantially parallel to the counterweight's top surface about a first pivot using a first motion and then rotated in a vertical plane that is substantially parallel to the counterweight's rear surface about a second pivot using a second motion. A tank bracket having a cradle moved to an extended position in two stages is referred to as a "two-stage" tank bracket.

FIGS. 1-3 show typical tank brackets designed to provide loading and unloading assistance. FIGS. 1 and 2 show typical designs for a single stage tank bracket, and FIG. 3 shows a typical design for a two-stage tank bracket.

FIG. 1 shows a diagram of a forklift truck (100) equipped with a prior art tank bracket (106). The tank bracket (106), which is mounted on forklift truck's counterweight (104), includes a frame (108) attached to the forklift truck (100), a cradle (110) rotatably connected to the frame (108) via a pivot (112), and a strap (114) connected to the cradle (110). A fuel tank (102) is disposed within the cradle (110), and the strap (114) is engaged around an uncovered portion of the fuel tank's circumference so that the fuel tank (102) does not fall out of the cradle (110). Further, the cradle (110) is shown in an extended position, and, accordingly, sits behind the counterweight (104) and outside the truck's body frame.

To maneuver the cradle to the retracted position, the cradle (110) is rotated about the pivot (112) such that the cradle (110) moves inward to a position above the counterweight (104) and inside the truck's body frame. Note that, in this tank bracket (106), the cradle (110) is rotated between the retracted and extended positions using a single motion. Because the cradle (110) may be rotated from the retracted position to the extended position using a single outward motion, tank bracket (106) is often referred to as a "swing out" fuel tank bracket.

FIG. 2 shows a diagram of a forklift truck (200) equipped with another prior art tank bracket (206). The tank bracket (206) includes a frame (208) mounted on the truck's head guard (216) just above a counterweight (204). As shown in FIG. 2, the frame (208) is actually a pair of brackets, where a first bracket (218) is mounted on a left side of the head guard (216) and a second bracket (220) is mounted on a right side of the head guard (216). Further, a cradle (210) is rotatably connected to the first bracket (218) via a pivot (212), and a strap (214) connected to the cradle (210) is engaged around a fuel tank (202). In the view shown, the cradle (210) is in an extended position.

To maneuver the cradle (210) to the retracted position, the cradle (210) is rotated inward about the pivot (212) to a position above the counterweight (204) and inside the forklift truck's body frame. The cradle (210) is locked to the frame's second bracket (220) via a latching mechanism. Note that, in this tank bracket (206), the cradle (210) is rotated between the retracted and extended positions using a single motion. Because the cradle (210) may be rotated to the extended position using a single outward motion, the tank bracket (206) is often referred to as a "swing out" fuel tank bracket.

The tank brackets shown in FIGS. 1 and 2 reduce the reach required to install a fuel tank, thereby reducing the difficulty of installing a tank and reducing risk to the operator.

FIG. 3 shows a diagram of a forklift truck (300) equipped with a prior art two-stage tank bracket (306) designed to reduce both a height and a reach required to install a fuel tank. The tank bracket (306) includes a frame (308), a cradle (310), and a strap (316). As shown in FIG. 3, the frame (308) is actually a pair of brackets, where a first bracket (322) is mounted on a left side of the truck's head guard (320) just above a counterweight (304) and a second bracket (324) is mounted on a right side of the head guard (320) just above the counterweight (304). The cradle (310) supports a mounted fuel tank (302) and is rotatably connected to the second bracket (324) via a first pivot (312) and a second pivot (314). The strap (316) is connected to the cradle (310) and engaged around the fuel tank (302). In the view shown, the cradle (310) is in an extended position.

To maneuver the cradle (310) into a retracted position, the cradle is rotated using two motions. In a first motion, an operator rotates the cradle (310) upward about a second pivot (314) to a position above and substantially parallel to the top surface of the counterweight (304) and outside the truck's body frame. After the first motion, the cradle (310) is locked such that it may not rotate about the second pivot (314). Then, in a second motion, the operator rotates the cradle (310) inward across the counterweight's top surface to a position inside the truck's body frame. At the end of the second motion, the cradle (310) is locked to the frame's first bracket (322).

The tank bracket (306) shown in FIG. 3 also includes gas springs (318) (only one is visible in FIG. 3) that are connected to the frame (308) and the cradle (310). The pair of gas springs (318) is used to support a portion of the weight of the cradle (310) and fuel tank (302) when the cradle (310) is rotated downwardly. Thus, although a motion for maneuvering the cradle (310) about the first pivot (312) is manual, when the cradle (310) is maneuvered about the second pivot (314), the gas springs (314) help support the combined cradle (310) and fuel tank (302) weight. Note that, because the cradle (310) may be rotated to the extended position using two separate motions, an outward motion and then a downward motion, the tank bracket (306) is often referred to as a "swing out, swing down" fuel tank bracket.

As described above, the tank bracket (306) shown in FIG. 3 requires two stages to maneuver between the retracted and extended positions. In each of these stages, the cradle (310) moves in either a vertical direction or a horizontal direction.

What is still needed, therefore, is a tank bracket that makes the loading and unloading of a fuel tank much easier for an operator.

SUMMARY OF INVENTION

According to one aspect of the present invention, a single stage, swing down fuel tank bracket comprises a frame immovably mounted onto a forklift truck; a cradle operatively connected to the frame and arranged to support a fuel tank; a hinge that pivotally connects a first end of the cradle to a first end of the frame; a latch having a first portion mounted on a second end of the frame and a second portion mounted on a second end of the cradle, wherein the second portion of the latch is releasably engaged with the first portion of the latch; wherein, after the latch is disengaged, the cradle is rotationally maneuverable between a retracted position and an extended position in a single stage, wherein, when the cradle is maneuvered between the retracted position and the extended position, the cradle moves simultaneously outwardly and downwardly in relation to a counterweight of the forklift truck.

According to another aspect of the present invention, a swing down fuel tank bracket comprises means for immovably mounting the tank bracket onto a forklift truck; means for supporting a fuel tank disposed on the tank bracket; means for rotationally maneuvering the means for supporting with respect to the means for immovably mounting; and means for releasably engaging the means for supporting to the means for immovably mounting, wherein, upon disengagement of the means for releasably engaging, the means for supporting is maneuvered between a retracted position and an extended position using the means for rotationally maneuvering in a single stage, and wherein, when the means for supporting is maneuvered from the retracted position to the extended position, the means for supporting moves along a three-dimensional trajectory in a direction that is outward and downward in relation to the forklift truck.

According to another aspect of the present invention, a method for maneuvering a cradle of a fuel tank bracket supporting a fuel tank from a retracted position to an extended position in a single stage comprises disengaging a latch from a second end of the cradle; and rotating a first end of the cradle about a hinge such that a second end of the cradle moves along a trajectory downward and outward from a frame of the tank bracket to the extended position, wherein, the rotating the first end of the cradle laterally extends a gas spring operatively connecting the cradle and the frame, and wherein, the extending gas spring generates a force that balances a force generated by the combined weight of the fuel tank and the cradle.

Other aspects and advantages of the invention will be apparent from the following description and the appended claims.

DETAILED DESCRIPTION

Figure 1:
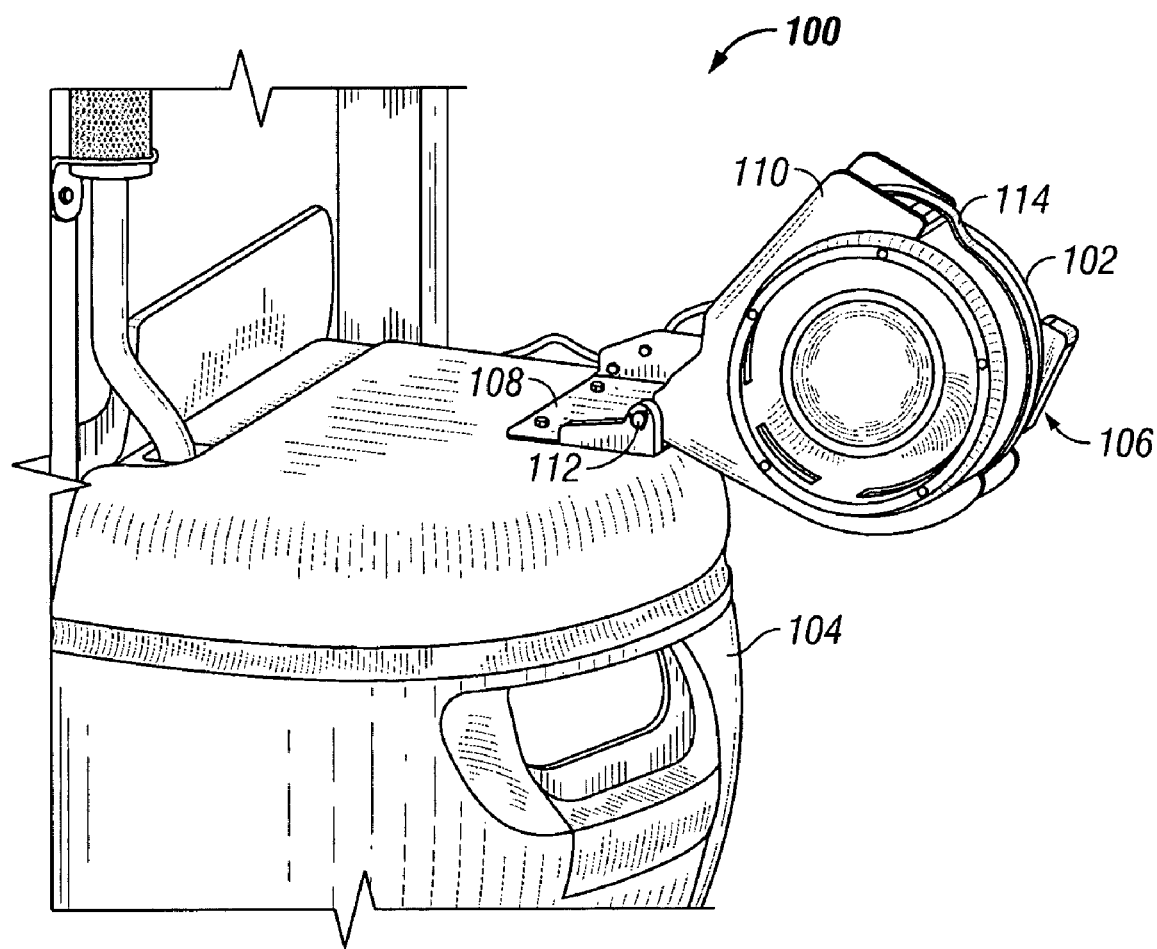
FIG. 1 shows a diagram of a forklift equipped with a prior art tank bracket.
Figure 2:
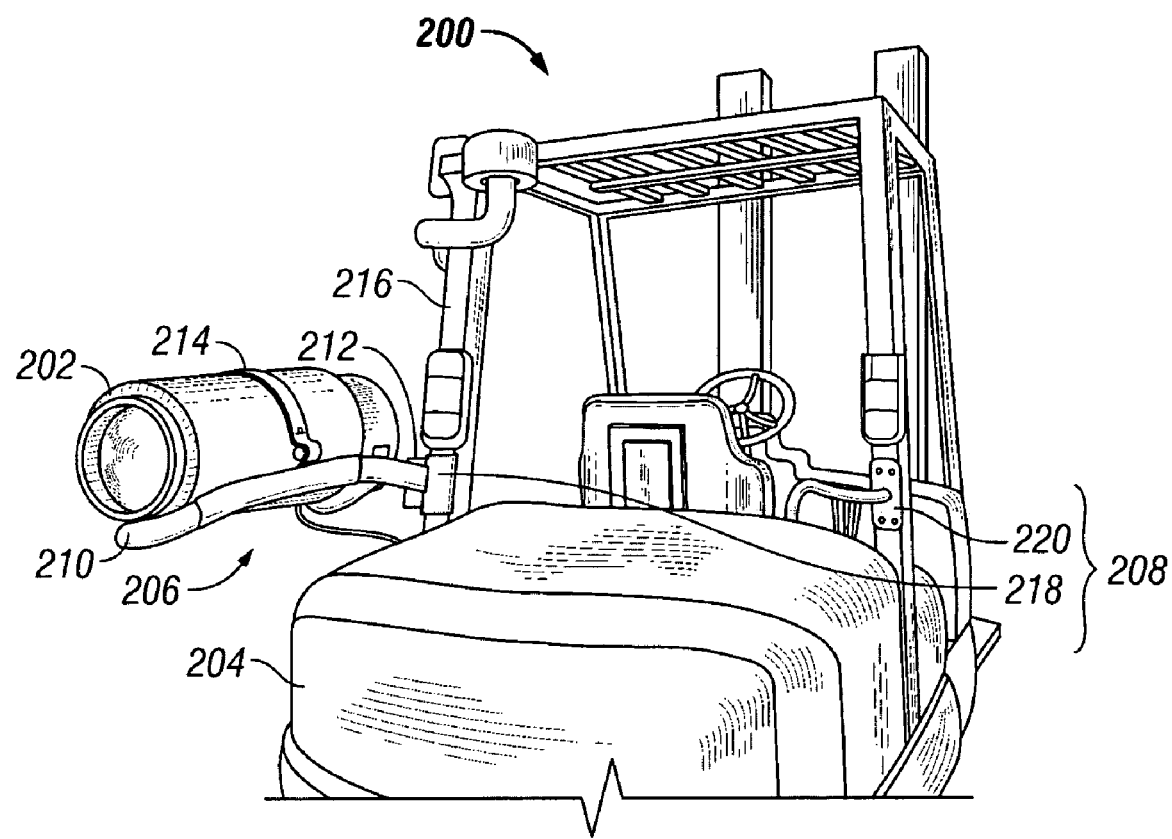
FIG. 2 shows a diagram of a forklift truck equipped with an alternative prior art tank bracket.
Figure 3:
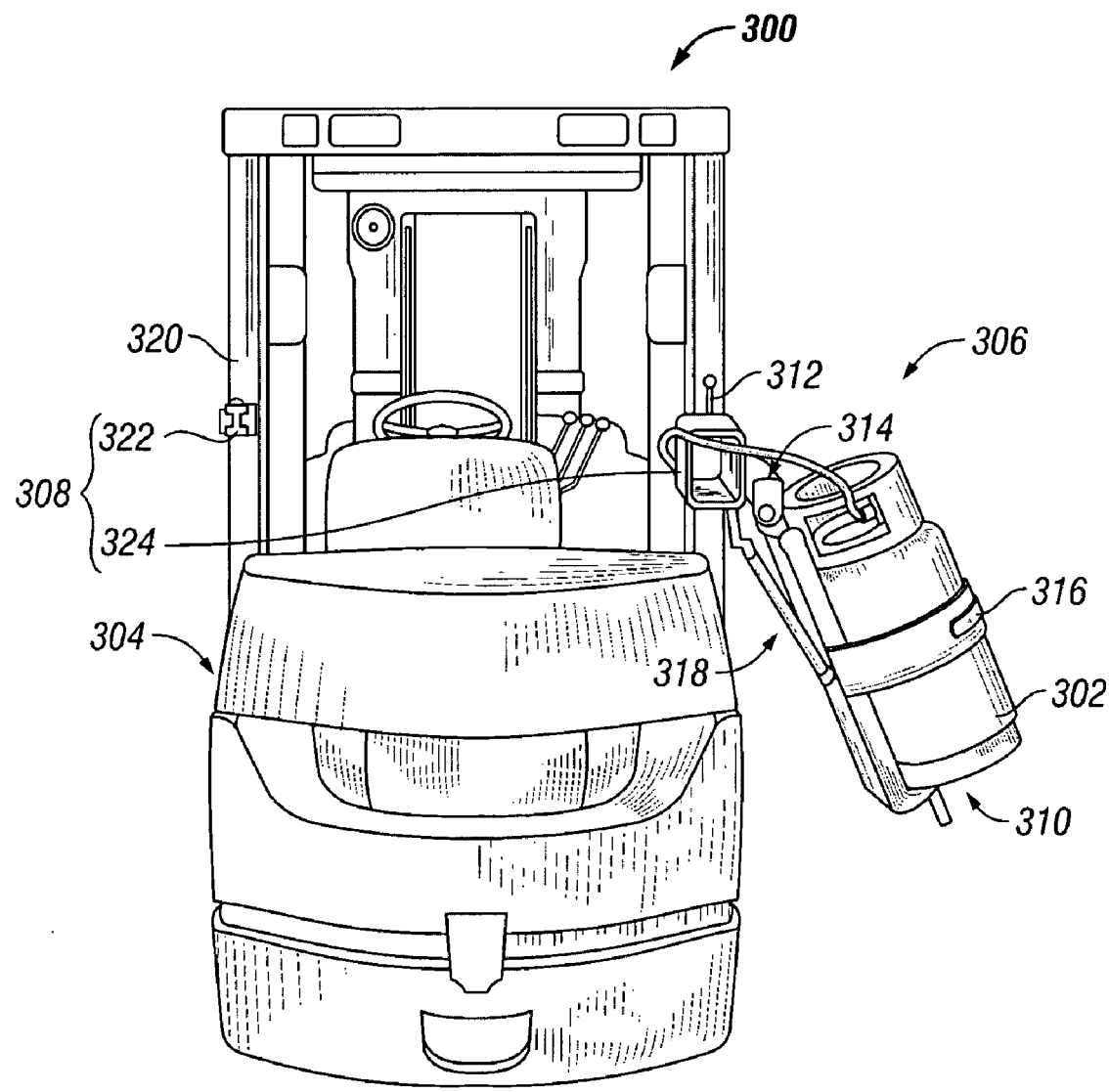
FIG. 3 shows a diagram of a forklift truck equipped with a second alternative prior art tank bracket.

Embodiments of the present invention will be described with reference to the accompanying drawings. Like items in the drawings are shown with the same reference numbers.

Embodiments of the present invention relate to a fuel tank bracket that may be swung out and downward in relation to a counterweight in a single stage. Embodiments of the present invention further relate to a single stage tank bracket that minimizes both a height and reach required to install a fuel tank.

Figure 4:
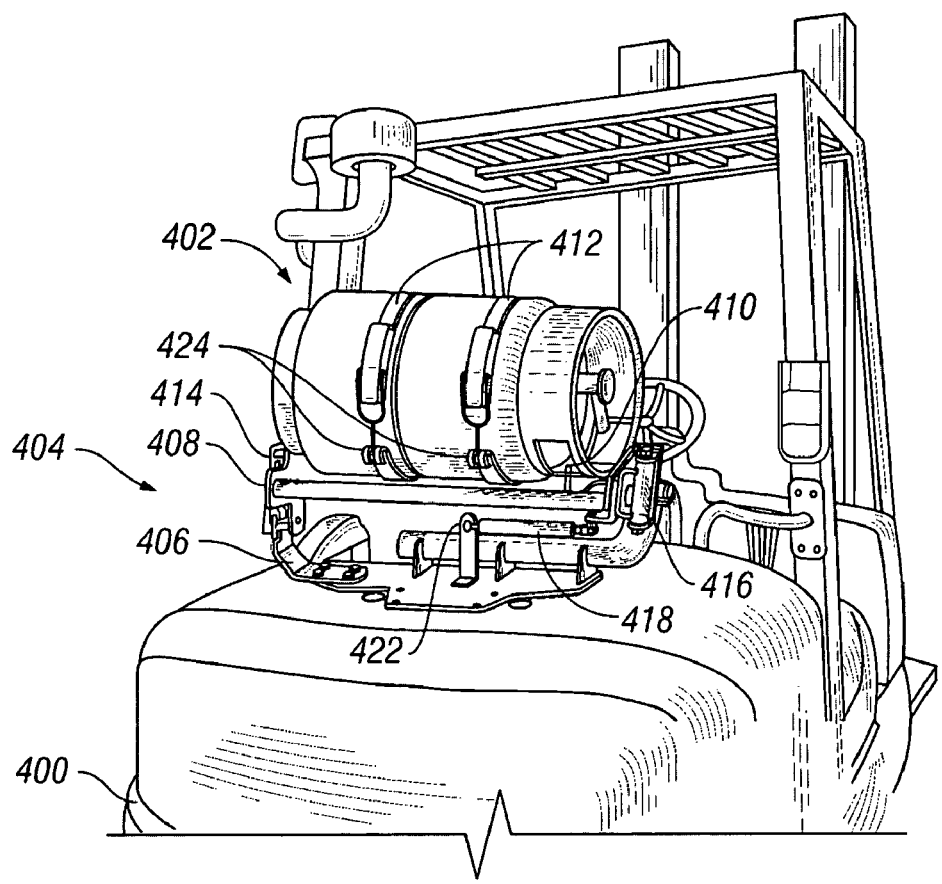
FIG. 4 shows a diagram of a tank bracket in accordance with an embodiment of the present invention.

FIG. 4 shows an exemplary diagram of a tank bracket (404) in accordance with an embodiment of the present invention. The tank bracket (404) includes a frame (406) and a cradle (408). The frame is mounted on a counterweight (400) of a forklift truck, and the cradle (408) is rotatably connected to the frame (406) via a hinge (416), which functions as a pivot for the tank bracket (404). A first portion of the hinge (416) is formed on a first end of the frame (406), and a second portion of the hinge (416) formed on a first end of the cradle (408). Also, the portion of the hinge (416) formed on the first end of the cradle (408) is operatively connected to the frame via a gas spring (418), where a first end of the gas spring (418) is connected to the hinge (416) and a second end of the gas spring (418) is connected to an anchor (422) protruding from the frame (406).

Referring to FIG. 4, the cradle (408), which supports a mounted fuel tank (402), includes straps (412) and an alignment pin (410) designed to lock the position of fuel tank (402). The straps (412) are attached to braces (424) disposed on the cradle (408) and are designed to be engaged around at least a portion of the fuel tank's circumference. The straps (412) secure the fuel tank (402) to the cradle (408). The alignment pin (410) is disposed on a surface of the cradle (408) facing the fuel tank (402) and is designed to fit into an opening of a rim of the fuel tank (402). The alignment pin (410) prevents the fuel tank (402) from rotating significantly with respect to the cradle (408).

Further, the fuel tank bracket (404) also includes a latch (414) for releasably coupling a second end of the cradle (408) to a second end of the frame (406). The latch (414) includes a first portion mounted on the second end of the cradle (408) and a second portion mounted on the second end of the frame (406). In some embodiments, the latch (414) may be of a type that conforms to a relevant motor vehicle safety standard, such as a standard automotive passenger restraint style dual toggle rotary latch with a self-aligning dovetail feature. In the view shown, the first and second portions of the latch (414) are engaged. With the latch (414) engaged, the cradle (408) is relatively immovable with respect to the forklift truck, and, as shown, lies inside the truck's body frame in a position just above and parallel to the tank bracket's frame (406). In the view shown, the cradle (408) is in a retracted position.

Figure 5:
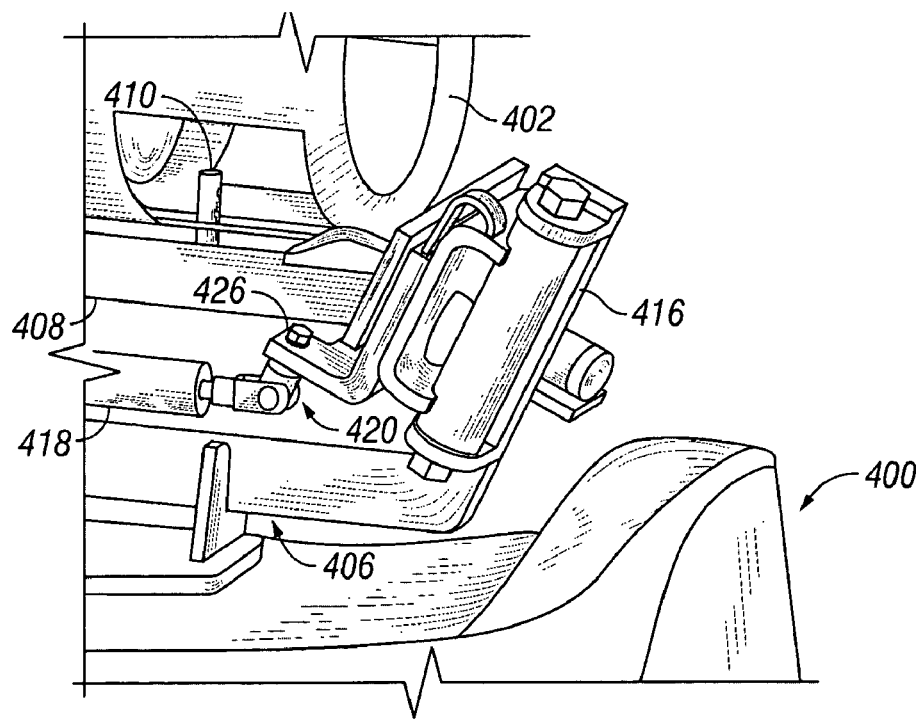
FIG. 5 shows an alternate view of the tank bracket shown in FIG. 4.

FIG. 5 shows a close-up view of the connection between the frame (406), the cradle (408), the hinge (416), and the gas spring (418). A pivot screw (420) operatively connects a first end of the gas spring (418) to the cradle (408). In the embodiment shown, a bottom end of the pivot screw (420) is jointed to the gas spring (418), and a top end of the pivot screw (420) is fitted through an opening in an anchor (426) disposed on the first end of the cradle (408). It is noted that the gas spring (418) may be coupled to the cradle (408) in any number of positions and by other means. Accordingly, as the cradle (408) is maneuvered between the retracted and extended positions, the pivot screw (420) is pulled along a trajectory similar to the arched trajectory traversed by the second end of the cradle (408). In addition, as the pivot screw (420) is pulled along the trajectory, the first end of the gas spring (418) is pulled along in the same direction by the pivot screw (420).

Note that, herein the term "horizontal" is used to describe a plane that is substantially parallel to the frame (406), and the term "vertical" is used to describe a plane that extends up and down and is substantially perpendicular to the frame (406). Thus, in the embodiment shown in FIGS. 4 and 5, the hinge (416) is provided at an angle to both a horizontal plane and a vertical plane. Advantageously, the angled placement of the hinge (416) allows the cradle (408) to be rotated outward and downward with respect to the frame (406) in a single stage, thereby minimizing an amount of movement and time required to maneuver the cradle (408) between the retracted and extended positions.

Figure 6:
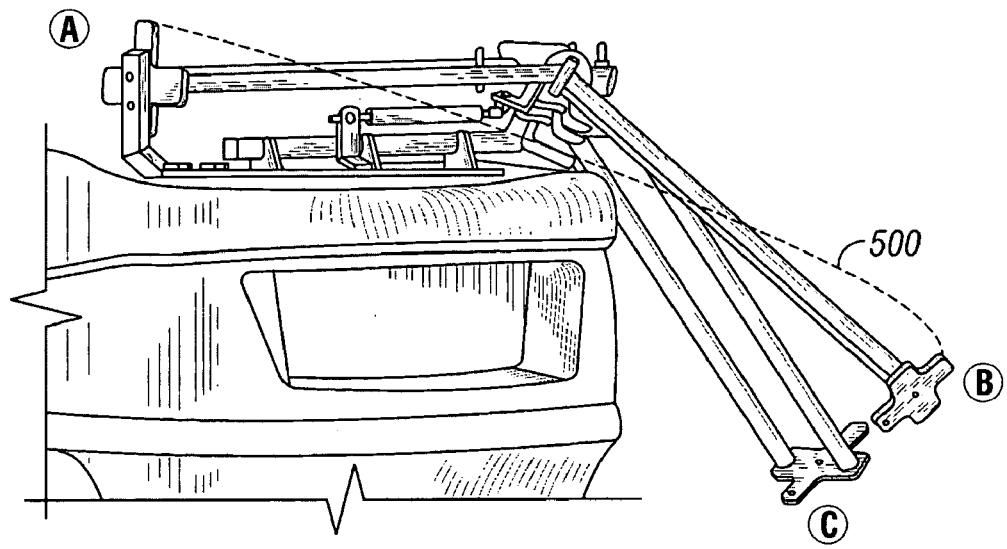
FIG. 6 shows a trajectory traversed by a cradle of a tank bracket in accordance with an embodiment of the present invention.

FIG. 6 shows a trajectory (500) that is traversed by the cradle (408) when maneuvered between a retracted position and an extended position. In order to illustrate the trajectory (500), three instances of the cradle (408) are shown, where each instance represents a different position along the path of the cradle (408). In order to more easily illustrate the trajectory (500), the fuel tank (402), the straps (412), and the brace (422) are not shown, and the location of the gas spring (418) is only shown for one instance of the cradle (408).

In FIG. 6, points "A," "B," and "C" each represent a particular position for which a location of the second end of the cradle (408) is shown. Further, as is also shown in FIG. 6, a dotted line representing the trajectory (500) traces out the path traversed by the uppermost portion of the second end of the cradle (408). Referring to FIG. 6, point "A" shows the location of the cradle (408) while the cradle (408) is in the retracted position. As mentioned above for FIG. 4, at point "A," the latch may be engaged, and the cradle (408) lies inside the truck's body frame in a horizontal position just above the counterweight (400).

Point "B" represents a position of the cradle (408) while the cradle (408) is being maneuvered between the retracted and extended positions. At point "B," the latch is not engaged, and the cradle (408) lies outside of the truck's body frame at an angle to both a horizontal and a vertical plane.

Point "C" represents the position of the cradle (408) while in the extended position. At point "C," the cradle (408) lies outside of the truck's body frame and at an angle to the side of the counterweight (400). In some embodiments, while in an extended position, the cradle (408) lies at an angle that is about 40 degrees away from a side surface of the counterweight (400) in a vertical plane.

In the extended position, shown at point "C," a fuel tank may be easily installed or removed from the cradle (408) because the cradle (408) is closer to the ground and closer to an operator who may be installing a fuel tank. Thus, very little reach is required, and a fuel tank may be installed by simply lifting the fuel tank a small distance to the cradle (408). The cradle may also be locked or latched into the extended position. This will render the cradle (408) relatively immovable during the change out process.

Note that, in order to maneuver the cradle (408) from the retracted position to the extended position, or from point "A" to point "C," the latch (414) coupling the second ends of the cradle (408) and frame (406) is disengaged, and the cradle (408) is rotated outwardly and downwardly about the hinge (416). Further, in order to maneuver the cradle (408) from the extended position to the retracted position, or from point "C" to point "A," the cradle (408) is rotated inwardly and upwardly about the hinge (416) until the first and second portions of the latch (414) engage, thereby latching the cradle (408) in position. Accordingly, when maneuvered between the retracted and extended positions, the cradle (408) completes an angle of rotation that is about 180 degrees in a horizontal plane, while also rotating downward by an angle of about 50 degrees.

It is noted that the embodiments shown in the figures include a latch that latches the tank bracket into place. Other types of locking or latching devices may be used without departing from the scope of the invention.

Figure 7A:
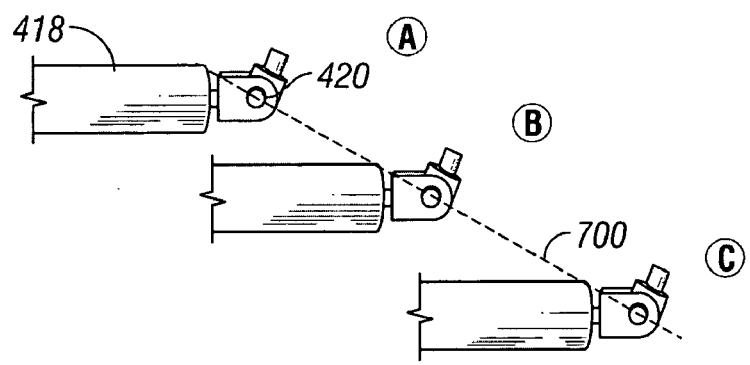
FIG. 7a shows a trajectory traversed by a gas spring of a tank bracket in accordance with an embodiment of the present invention.
Figure 7B:
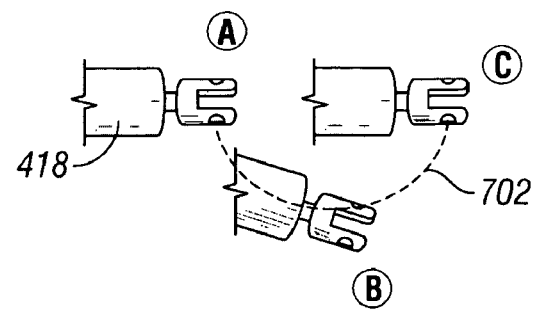
FIG. 7b shows a trajectory traversed by a gas spring of a tank bracket in accordance with an embodiment of the present invention.

FIGS. 7a and 7b, respectively, show a vertical component (700) and a horizontal component (702) of a trajectory that is traversed by the pivot screw (420) and the first end of the gas spring (418) when the cradle (408) is maneuvered between a retracted position and an extended position. In order to illustrate the trajectory, three positions of the gas spring (418) are shown, where each position represents a different location of the gas spring (418). Specifically, in order to illustrate the vertical component (700) of the trajectory, FIG. 7a shows a side view of the positions of the gas spring (418). In order to illustrate the horizontal component (702) of the trajectory, FIG. 7b shows an overhead view of the positions of the gas spring (418). In order to more easily illustrate the trajectory, the connection between the gas spring (418) and the brace disposed on the hinge (416) is not shown.

In FIGS. 7a and 7b, each position of the gas spring (418) illustrates a spatial location of the first end of the gas spring (418) at point "A," "B," or "C." As also shown in FIGS. 7a and 7b, dotted lines representing the vertical and horizontal components (700, 702 respectively) of the trajectory trace out the path traversed by pivot screw (420), and, hence, the first end of the gas spring (418).

Referring to FIGS. 7a and 7b, point "A" shows the location of the gas spring (418) while the cradle (408) is in the retracted position. At point "A," the gas spring (418) is unextended.

Point "B" shows the location of the gas spring (418) while the cradle (408) is in between the retracted and extended positions. At point "B," the gas spring (418) is partially extended. As shown in FIG. 7b, the gas spring (418) has been maneuvered outward in relation to the counterweight (400).

Point "C" shows the location of the gas spring (418) while the cradle (408) is in the extended position. At point "C," the gas spring (418) is fully extended. As shown in FIG. 7b, the gas spring (418) has been maneuvered inward in relation to the counterweight (400) and is back in alignment with its position at point "A."

It is noted that the gas spring (418) provides a force that tends to pull the cradle (408) toward the retracted position. Thus, the gas spring (418) retards the downward motions, and also assists an operator who is swinging the cradle (418) from the extended position to the retracted position.

Figure 8:
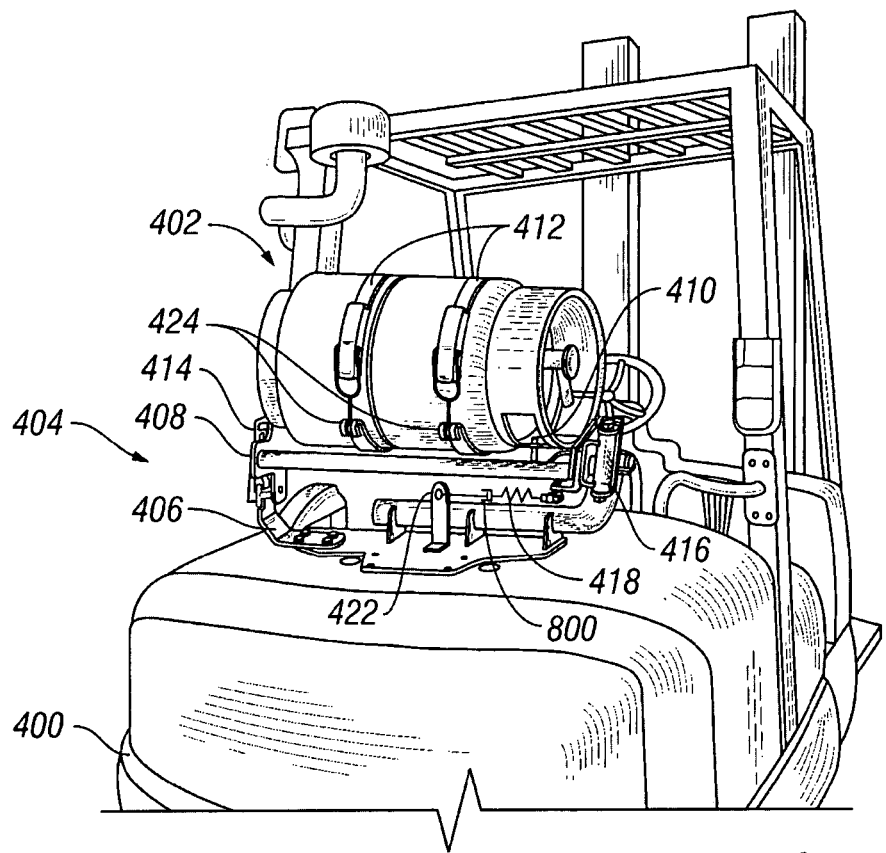
FIG. 8 is a schematic diagram of a tank bracket having a gas spring and a damper in accordance with an embodiment of the present invention.

Referring now to FIG. 8, in some embodiments, the fuel tank bracket (406) is fitted with a motion damper (800) designed to slow a free fall motion of the cradle (408) and the fuel tank (402) as the cradle (408) is maneuvered from the retracted position to the extended position. In some cases, a first end of the motion damper (800) is connected to the anchor (422) disposed on the frame (406), and a second end of the motion damper (800) is connected to the gas spring (418). It is noted that a motion dampener (800) will not provide an upward force; it will only prevent the cradle from falling to the extended position at a speed that may be hazardous to personnel and to the equipment. Thus, because the motion damper (800) only operates to slow free fall motion of the cradle (408) and the fuel tank (402), the operator is still required to manually maneuver the cradle (408) from the extended to the retracted position.

Figure 9:
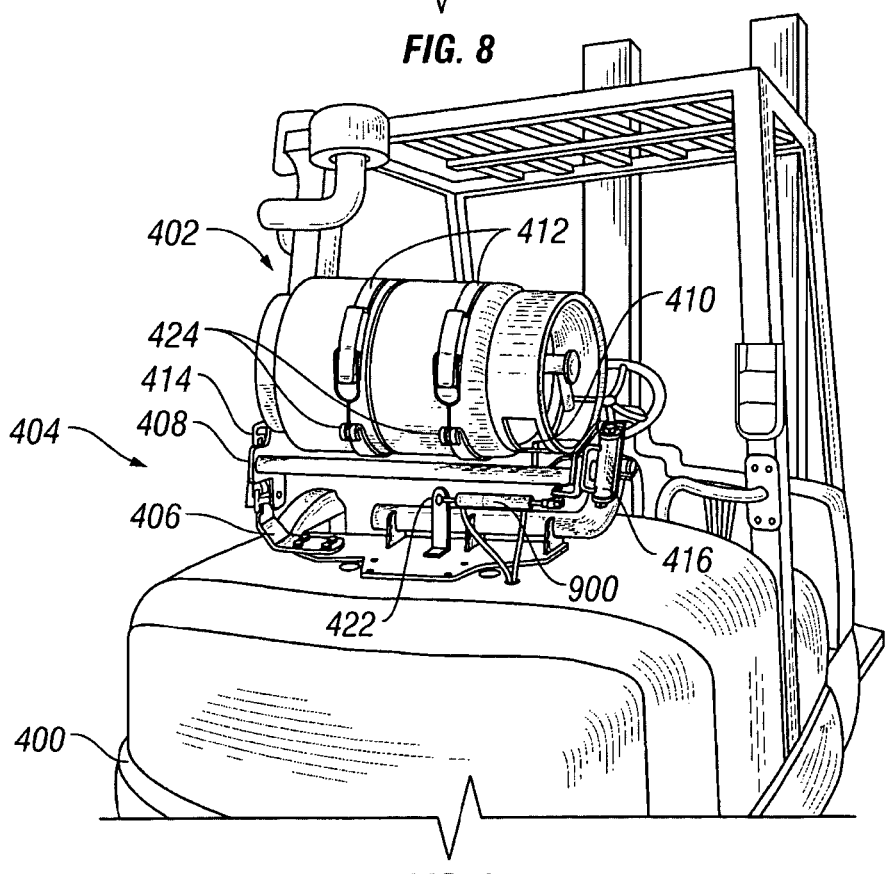
FIG. 9 is a schematic diagram of a tank bracket having a hydraulic device in accordance with an embodiment of the present invention.

Referring now to FIG. 9, in an alternative embodiment, a gas spring or a motion damper may be replaced with a hydraulic device (900). Advantageously, the hydraulic device (900) mechanically maneuvers a cradle between a retracted and an extended position without operator assistance.

In some embodiments, the fuel tank bracket (406) is fitted with a motion damper designed to slow a free fall motion of the cradle (408) and the fuel tank (402) as the cradle (408) is maneuvered from the retracted position to the extended position. In some cases, a first end of the motion damper is connected to the anchor (422) disposed on the frame (406), and a second end of the motion damper is connected to the pivot screw (420). It is noted that a motion dampener will not provide an upward force; it will only retard the speed at which the cradle moves to the extended position. Thus, because the motion damper only operates to slow free fall motion of the cradle (408) and the fuel tank (402), the operator is still required to manually maneuver the cradle (408) from the extended to the retracted position.

In some embodiments, a dampener may also have dampening in the opposite direction. This will protect the equipment by preventing an operator from maneuvering the cradle (408) to the retracted position with an excessive amount of speed and force.

Note that, in other embodiments, a vertical component and/or a horizontal component of the trajectories traversed by the cradle and/or the pivot screw and gas spring may vary dependent on design parameters that may include but are not limited to a placement of the tank bracket, an angle of placement for the hinge pivot, a weight of the fuel tank, a weight of the cradle and/or the frame of tank bracket, and a force generated by the gas spring or the motion damper.

Advantages of the present invention may include one or more of the following. In one or more embodiments, because a pivot screw and a hinge operatively connect a cradle of a tank bracket to a frame of the tank bracket to enable the cradle to move along a trajectory that is simultaneously downward and outward in relation to the frame, the cradle may be maneuvered between a retracted position and an extended position in a single stage.

In one or more embodiments, because a force generated by a gas spring balances a force generated by a combined weight of a cradle of a tank bracket and a fuel tank supported by the cradle, the cradle may be maneuvered between a retracted position and an extended position with minimal operator assistance.

In one or more embodiments, because a damper is used to at least partially balance a force generated by a combined weight of a cradle of a tank bracket and a fuel tank supported by the cradle, the cradle may be maneuvered from a retracted position to an extended position without operator assistance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A swing down tank bracket, comprising:
   a frame immovably mounted onto a vehicle;
   a cradle operatively connected to the frame and arranged to support a fuel tank;
   a hinge that pivotally connects a first end of the cradle to a first end of the frame; and
   a latch having a first portion disposed on a second end of the frame and a second portion disposed on a second end of the cradle, wherein the first portion of the latch is releasably engaged with the second portion of the latch,
   wherein, after the latch is disengaged, the cradle is rotatable between a retracted position and an extended position by simultaneously rotating outwardly and downwardly in relation to the vehicle in a single uninterrupted downward stage such that the second end of the cradle traverses an uninterrupted arcuate path.

2. The swing down tank bracket of claim 1, wherein the vehicle is a forklift truck.

3. The swing down tank bracket of claim 2, wherein in the retracted position, the cradle is positioned substantially parallel to the frame.

4. The swing down tank bracket of claim 2, wherein in the retracted position, the cradle is positioned substantially parallel to an upper surface of a counterweight of the forklift truck, and wherein, in an extended position, the cradle is positioned at an angle to a side surface of the counterweight.

5. The swing down tank bracket of claim 1, further comprising:
   a gas spring, wherein a first end of the gas spring is operatively connected to the frame; and
   a pivot screw operatively connecting a second end of the gas spring to the first end of the cradle, wherein, while the cradle is maneuvered from the retracted position to the extended position, the gas spring resists the motion of the cradle.

6. The swing down tank bracket of claim 5, wherein the gas spring provides a near full assist for maneuvering the cradle from the extended position to the retracted position when a full fuel tank is positioned in the cradle, and further comprising a second latch for selectively latching the cradle in the extended position.

7. The swing down tank bracket of claim 1, further comprising a set of straps operatively coupled to the cradle and arranged to be releasably engaged around a circumference of the fuel tank.

8. The swing down tank bracket of claim 1, wherein the cradle comprises an alignment pin arranged to fit into an opening in a rim of the fuel tank.

9. The swing down tank bracket of claim 1, further comprising a dampener operatively connected between the frame and the cradle.

10. The swing down tank bracket of claim 1, wherein, in an extended position, the cradle is positioned at an angle about 40 degrees outward from a side surface of the vehicle.

11. A swing down tank bracket, comprising:
  means for immovably mounting the tank bracket onto a forklift truck;
  means for supporting a fuel tank disposed on the tank bracket;
  means for rotationally maneuvering the means for supporting with respect to the means for immovably mounting; and
  means for releasably engaging the means for supporting and the means for immovably mounting,
  wherein, upon disengagement of the means for releasably engaging, the means for supporting is maneuvered between a retracted position and an extended position in a direction that is outward and downward in relation to the forklift truck such that the means for supporting traverses a single stage uninterrupted arcuate path in a downward direction using the means for rotationally maneuvering.

12. The swing down tank bracket of claim 11, further comprising:
  means for balancing a rotation of the means for supporting,
  wherein, upon disengagement of the means for releasably engaging, the means for balancing resists a motion of the means for supporting such that the means for supporting is maneuvered with minimal operator assistance.

13. The swing down tank bracket of claim 12, wherein the means for balancing moves along a trajectory substantially similar to a trajectory traversed by the means for supporting while the means for supporting is maneuvered from a retracted position to an extended position.

14. The swing down tank bracket of claim 12, wherein the means for supporting comprises means for securing the tank bracket to the means for supporting.

15. The swing down tank bracket of claim 12, further comprising:
  means for damping the rotation of the means for supporting,
  wherein, upon disengagement of the means for releasably engaging, the means for damping retards a motion of the means for supporting.

16. The swing down tank bracket of claim 5, wherein the gas spring comprises a motion damper.

* * * * *